United States Patent
Kampmann et al.

(10) Patent No.: US 11,867,247 B2
(45) Date of Patent: Jan. 9, 2024

(54) MULTIPLE VARIABLE TURN WAVE SPRINGS, METHODS OF PRE-LOADING COMPONENTS WITH SAID SPRINGS, AND METHODS OF MANUFACTURING SAID SPRINGS

(71) Applicant: ROTOR CLIP COMPANY, INC., Somerset, NJ (US)

(72) Inventors: Elmar Joerg Kampmann, Senden (DE); David Marvuglio, Somerset, NJ (US); James Shamus, Somerset, NJ (US)

(73) Assignee: ROTOR CLIP COMPANY, INC., Somerset, NJ (US)

( * ) Notice: Subject to any disclaimer, the term of this patent is extended or adjusted under 35 U.S.C. 154(b) by 0 days.

(21) Appl. No.: 17/903,658

(22) Filed: Sep. 6, 2022

(65) Prior Publication Data
US 2023/0081050 A1    Mar. 16, 2023

Related U.S. Application Data

(60) Provisional application No. 63/243,388, filed on Sep. 13, 2021.

(51) Int. Cl.
*F16F 1/04*    (2006.01)

(52) U.S. Cl.
CPC .................. *F16F 1/048* (2013.01)

(58) Field of Classification Search
CPC ....... F16F 1/048; F16F 1/328; F16C 2361/00; F16C 2361/53; F16C 25/04; F16C 25/083
See application file for complete search history.

(56) References Cited

U.S. PATENT DOCUMENTS

| 6,254,071 | B1 * | 7/2001 | Greenhill | F16F 1/328 |
| | | | | 267/161 |
| 9,429,179 | B2 * | 8/2016 | Tran | F16F 1/328 |
| 11,451,108 | B2 | 9/2022 | Tinney | |
| 11,536,340 | B2 * | 12/2022 | Zheng | F16F 1/048 |

(Continued)

FOREIGN PATENT DOCUMENTS

| DE | 102019101604 A1 * | 7/2020 |
| DE | 102019101604 A1 | 7/2020 |

(Continued)

OTHER PUBLICATIONS

Extended European Search Report dated Feb. 23, 2023, in connection with European Application No. 22195118.9.

*Primary Examiner* — Vishal R Sahni
(74) *Attorney, Agent, or Firm* — Norris McLaughlin, P.A.

(57) ABSTRACT

Wave springs having multiple variable turns, methods of pre-loading components with said wave springs, and methods of manufacturing said wave springs are provided. The wave spring has a total height defined by a first end portion and a second opposite end portion and an intermediate portion disposed between the first and second end portions. The intermediate portion has active turns with waved or non-planar turns and non-active turns with planar or non-waved turns. The wave spring also has a first alignment disposed between the first and second end portions, wherein first alignment comprises at least two waved or non-planar turns being aligned with each other.

19 Claims, 11 Drawing Sheets

(56) References Cited

U.S. PATENT DOCUMENTS

| | | | |
|---|---|---|---|
| 2015/0132080 A1* | 5/2015 | Tran | F16F 1/328 |
| | | | 411/517 |
| 2015/0250604 A1* | 9/2015 | Fonte | A61F 2/3094 |
| | | | 623/17.13 |
| 2019/0058370 A1 | 2/2019 | Tinney | |
| 2022/0196100 A1* | 6/2022 | Zheng | F16F 1/328 |
| 2022/0381311 A1* | 12/2022 | Jeng | F16F 1/366 |

FOREIGN PATENT DOCUMENTS

| | | | | |
|---|---|---|---|---|
| EP | 2842421 A1 * | 3/2015 | | A01K 89/02 |
| EP | 3683936 A2 | 7/2020 | | |
| JP | H0554833 U * | 1/1993 | | |
| JP | 06010637 U | 2/1994 | | |
| JP | 2000274468 A * | 10/2000 | | |
| JP | 2001003969 A * | 1/2001 | | |
| JP | 2002242969 A * | 8/2002 | | |
| JP | 5337302 B2 * | 11/2013 | | F16D 25/00 |
| WO | WO-2011152025 A1 * | 12/2011 | | F16D 25/00 |
| WO | WO-2018235660 A1 * | 12/2018 | | B21F 3/08 |

\* cited by examiner

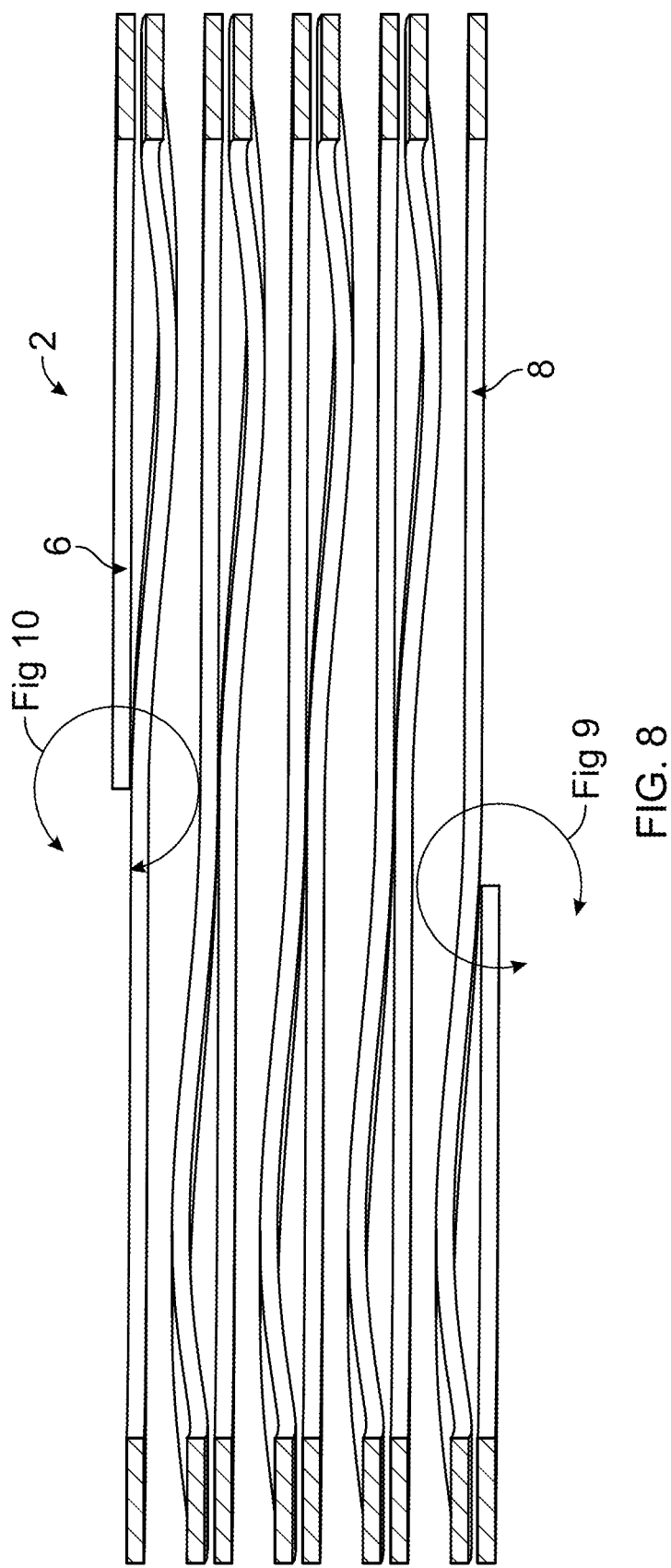
FIG. 8
FIG. 9
FIG. 10

MULTIPLE VARIABLE TURN WAVE SPRINGS, METHODS OF PRE-LOADING COMPONENTS WITH SAID SPRINGS, AND METHODS OF MANUFACTURING SAID SPRINGS

This non-provisional application claims priority from U.S. provisional application Ser. No. 63/243,388, filed Sep. 13, 2021, which is incorporated herein by reference in its entirety.

TECHNICAL FIELD OF THE DISCLOSURE

The present disclosure pertains to the field of wave springs, methods of pre-loading components with said wave springs, and methods of manufacturing said wave springs. More specifically, the present disclosure relates to wave springs having multiple variable turns comprising active and non-active turns. The present wave springs have aligned active turns such that one or more crests and/or troughs are aligned with each other to generate higher or lower loads for the wave springs.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, a wave spring having multiple variable turns is provided. The wave spring may comprise a total height defined by a first end portion and a second opposite end portion and an intermediate portion disposed between the first and second end portions. The intermediate portion may comprise active turns comprising waved or non-planar turns and non-active turns comprising planar or non-waved turns. The wave spring may further comprise a first alignment disposed between the first and second end portions, wherein first alignment comprises at least two waved or non-planar turns aligned with each other.

In an embodiment, at least one non-active turn may be disposed between the at least two waved or non-planar turns that are aligned with each other.

In an embodiment, the at least two waved or non-planar turns may comprise at least one wave crest and at least one wave trough.

In an embodiment, the at least two waved or non-planar turns may comprise either at least two wave crest or at least two wave troughs.

In an embodiment, at least one non-active turn may be disposed between: a wave crest and a wave trough; two wave crests; or two wave troughs.

In one or more embodiments, a method may comprise coiling a flat wire onto itself to produce the present wave spring as disclosed herein.

In one or more embodiments, a method may comprise preloading one or more components with the present wave spring as disclosed herein.

In one or more embodiments a wave spring may have multiple variable turns and/or may comprise a total height defined by a first end portion and a second opposite end portion, an intermediate portion disposed between the first and second end portions, wherein the intermediate portion may comprise active turns comprising waved or non-planar turns and non-active turns comprising planar or non-waved turns. The wave spring may further comprise a first alignment disposed between the first and second end portions, wherein first alignment comprises at least two waved or non-planar turns being aligned with each other.

In an embodiment, at least one non-active turn may be disposed between the at least two waved or non-planar turns that are aligned with each other.

In an embodiment, the at least two waved or non-planar turns may comprise at least one wave crest and at least one wave trough.

In an embodiment, the at least two waved or non-planar turns may comprise either at least two wave crest or at least two wave troughs.

In an embodiment, at least one non-active turn may be disposed between: a wave crest and a wave trough; two wave crests; or two wave troughs.

In an embodiment, the intermediate portion may comprise the active turns, the non-active turns, or at least one combination thereof.

In one or more embodiments, a method may comprise coiling a flat wire onto itself to produce a wave spring that comprises a first end portion, a second end portion opposite with respect to the first end portion, active turns disposed between the first and second end portions and comprising waved or non-planar turns, non-active turns disposed between the first and second end portions and comprising planar or non-waved turns, and an aligned portion of the active and non-active turns having at least one non-active turn disposed between at least two active turns.

In an embodiment, the at least two active turns may comprise at least two wave troughs, at least two wave crests, or at least one wave trough and at least one wave crest.

In an embodiment, the at least two wave crests or the at least two wave troughs may be aligned with respect to each other and at least a portion of the at least one non-active turn is disposed therebetween.

In an embodiment, the at least one wave trough may be aligned with the at least one wave crest and at least a portion of the at least one non-active turn may be disposed therebetween.

In an embodiment, the method may further comprise preloading at least one component of an automotive e-motor with the wave spring.

In an embodiment, the method may further comprise applying an axial force provided by the wave spring against at least one component or placing at least one torsional load on or against the spring.

In one or more embodiments, a method may comprise applying at least one torsional load on or against a wave spring, wherein the wave spring comprises an intermediate portion disposed between a first end portion and a second end portion opposite with respect to the first end portion, active turns disposed between the first and second end portions and comprising at least one wave crest, at least one wave trough, or at least one combination thereof, a planar or non-waved turn disposed between at least two active turns, and an aligned portion disposed at the intermediate portion, wherein the aligned portion comprises at least two active turns having wave crests, wave troughs, or at least one wave crest and at least one wave trough.

In an embodiment, the at least component may apply the at least one torsional load on or against the wave spring.

In an embodiment, the aligned portion may comprise wave crests or wave troughs aligned with respect to each other.

In an embodiment, the at least one wave crest and the at least one wave trough of the aligned portion may be aligned with respect to each other.

In an embodiment, at least one non-active turn of the intermediate portion may be planar or may comprise non-waved curves or turns.

In an embodiment, the at least one non-active turn may be disposed between two adjacent active turns.

In an embodiment, the at least one non-active turn may be disposed between at least two aligned wave crests, at least two aligned wave toughs, or at least one wave crest aligned with at least one wave trough.

In an embodiment, the method may further comprise applying an axial force provided by the wave spring against the at least one component for preloading the at least one component.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 8 is a cross-sectional view of a multiple variable turn wave spring along line 8-8 shown in FIG. 7, according to one or more embodiments of the present disclosure.

FIGS. 9 and 10 are partial cross-sectional views of first and second end portions of a multiple variable turn wave spring, according to one or more embodiments of the present disclosure.

DETAILED DESCRIPTION

Figure 1:
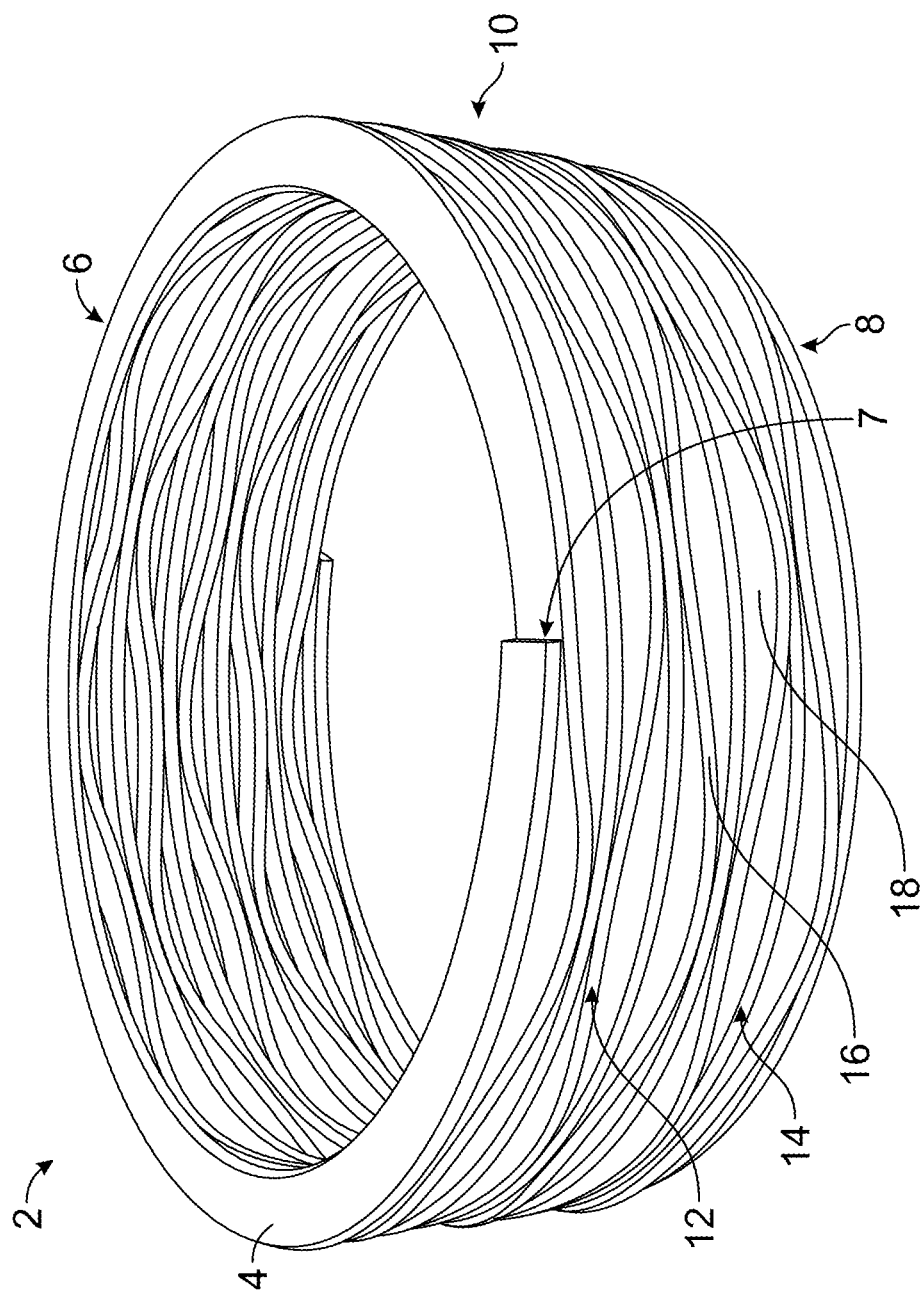
FIG. 1 is a top perspective view of a multiple variable turn wave spring, according to one or more embodiments of the present disclosure.
Figure 2:
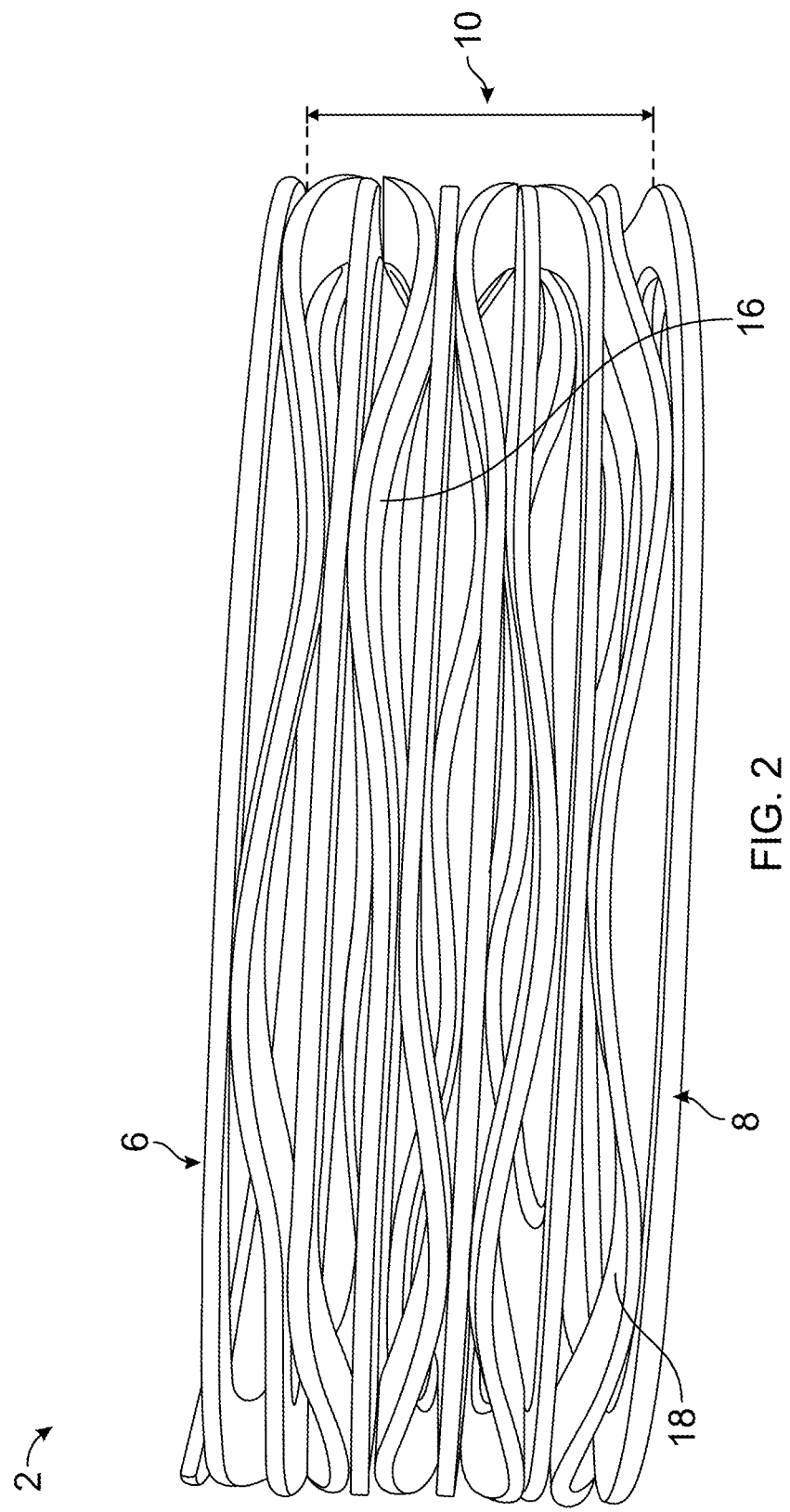
FIG. 2 is a first side plan view of a multiple variable turn wave spring, according to one or more embodiments of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

FIGS. 1-4 illustrate embodiments of the present multiple variable turn wave spring 2 (hereinafter "spring 2") configured to pre-load one or more components and/or to apply one or more loads onto the one or more components. The spring 2 comprising a flat wire 4 (hereinafter "wire 4") which may be made from at least one raw material. In an embodiment, the at least one raw material of the wire 4 may comprise at least one rolled round wire. The diameter of the at least one raw material may be any diameter known to one of ordinary skill in the art.

The spring 2 has a total height defined between a first end portion 6 (hereinafter "first portion 6") of the spring 2 and a second end portion 8 (hereinafter "second portion 8") of the spring 2. An intermediate portion 10 of the spring 2 is disposed between the first portion 6 and the second portion 8. The first end portion 6 may end or terminate at a first end 7, and the second end portion 8 may end or terminate at a second end 9.

At least one of the first portion 6, the second portion 8, and the intermediate portion 10 may comprise one or more active turns 12 (hereinafter "active turns 12") and/or one or more non-active turns 14 (hereinafter "non-active turns 14"). The active turns 12 and the non-active turns 14 define a coiled portion of the spring 2 that extends between the first and second end portions 6, 8 of the spring 2 or along the entire height of the spring 2 in the axial direction of the spring 2. The active turns 12 are non-planar or waved curves or turns that define the coiled portion of the spring 2. In embodiments, the active turns 12 comprise one or more wave crests 16 and/or one or more wave troughs 18. The non-active turns 14 are planar or non-waved curves or turns that further define the coiled portion of the spring 2.

In embodiments, at least one of the first portion 6, the second portion 8, and the intermediate portion 10 may comprise the non-active turns 14 and/or may be free of the active turns 12. The first and second portions 6, 8 may end or terminate at the first and second ends 7, 9, respectively, and the first and second ends 7, 9, respectively, may be disposed adjacent to or may be in contact with at least one active turn 12 or at least one non-active turn 14.

In embodiments, the spring 2 may comprise at least one non-active turn 14 disposed between two active turns 12. In some embodiments, all of the active turns 12 may be disposed between the non-active turns 14. In other embodiments, one non-active turn 14 may be disposed between crests 16 of two adjacent active turns 14 and/or troughs 18 of two adjacent active turns 14. In still further embodiments, one non-active turn 14 may be disposed between one crest 16 of a first active turn 14 and one trough 18 of a second active turn 14.

In embodiments, at least two active turns 12 align with each other and may extend along the height of the spring 2, be disposed between the first and second portions 6, 8 of the spring 2, and/or extend in the axial direction of the spring 2. The at least two active turns 12 aligned with each other may at least about 5% of a total of the active turns 12 of the spring 2. In embodiments, the at least two active turns 12 aligned with each other may range from about 10% to about 95% of the total of the active turns 12 of the spring 2. In other embodiments, the at least two active turns 12 aligned with each other may range from about 25% to about 90% of the total of the active turns 12 of the spring 2. In yet other embodiments, the at least two active turns 12 aligned with each other may range from about 50% to about 85% of the total of the active turns 12 of the spring 2. In an embodiment, the at least two active turns 12 aligned with each other may be less than 99% of the total of the active turns of the spring 2.

In other embodiments, one or more of the active turns 12 and one or more of the non-active turns 14 align with each other (hereinafter "aligned active and non-active turns 12, 14") and may extend along the height of the spring 2, be disposed between the first and second end portions 6, 8 of the spring 2, and/or extend in the axial direction of the spring 2. In embodiments, the aligned active and non-active turns 12, 14 may be less than 95% or greater than 1% of a total of the active turns and the non-active turns 12, 14 of the spring 2.

Figure 3:
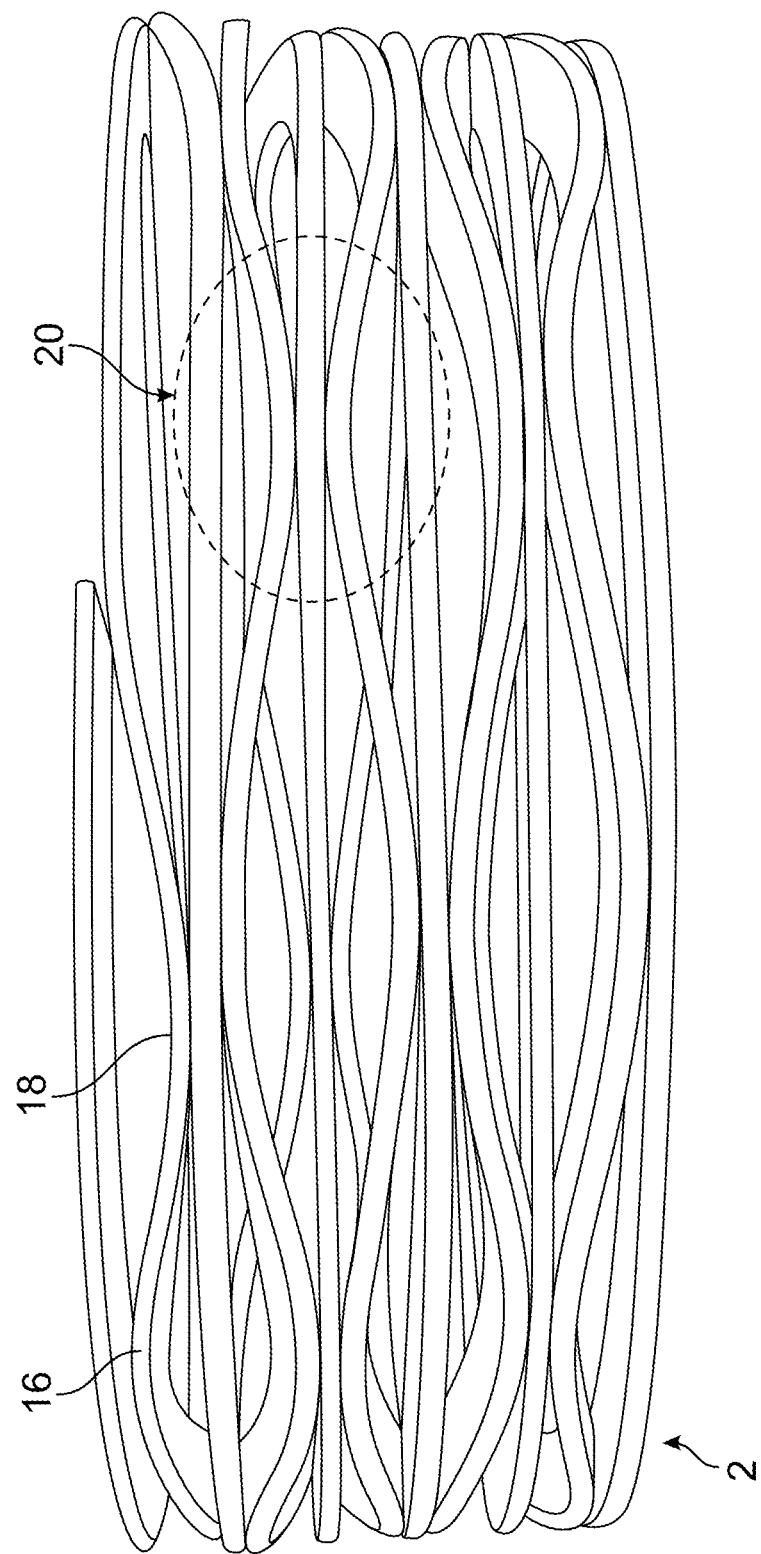
FIG. 3 is a second side plan view of a multiple variable turn wave spring, according to one or more embodiments of the present disclosure.

As shown in FIG. 3, a first aligned portion 20 of the spring 2 may comprise a first alignment of the active turns 12 such that one or more troughs 18 of one or more first active turns 12 align with one or more crests 16 of one or more second active turns 12, wherein the first and second active turns 12 are adjacent with respect to each other. In an embodiment, one or more non-active turns 14 may be disposed between the first and second active turns 12. For example, troughs 18 of higher-level active turn 12 may be aligned with crest 16 of lower-level active turn 12. In other words, crests 16 of the first active turns 12 may be aligned with troughs 18 of the second active turns 12. As a result of the first alignment of the active turns 12 in the first aligned portion 20, the spring 2 comprising the first aligned portion 20 may generate higher load values than load values generated by a wave spring free of the first alignment of the active turns 12.

Figure 4:
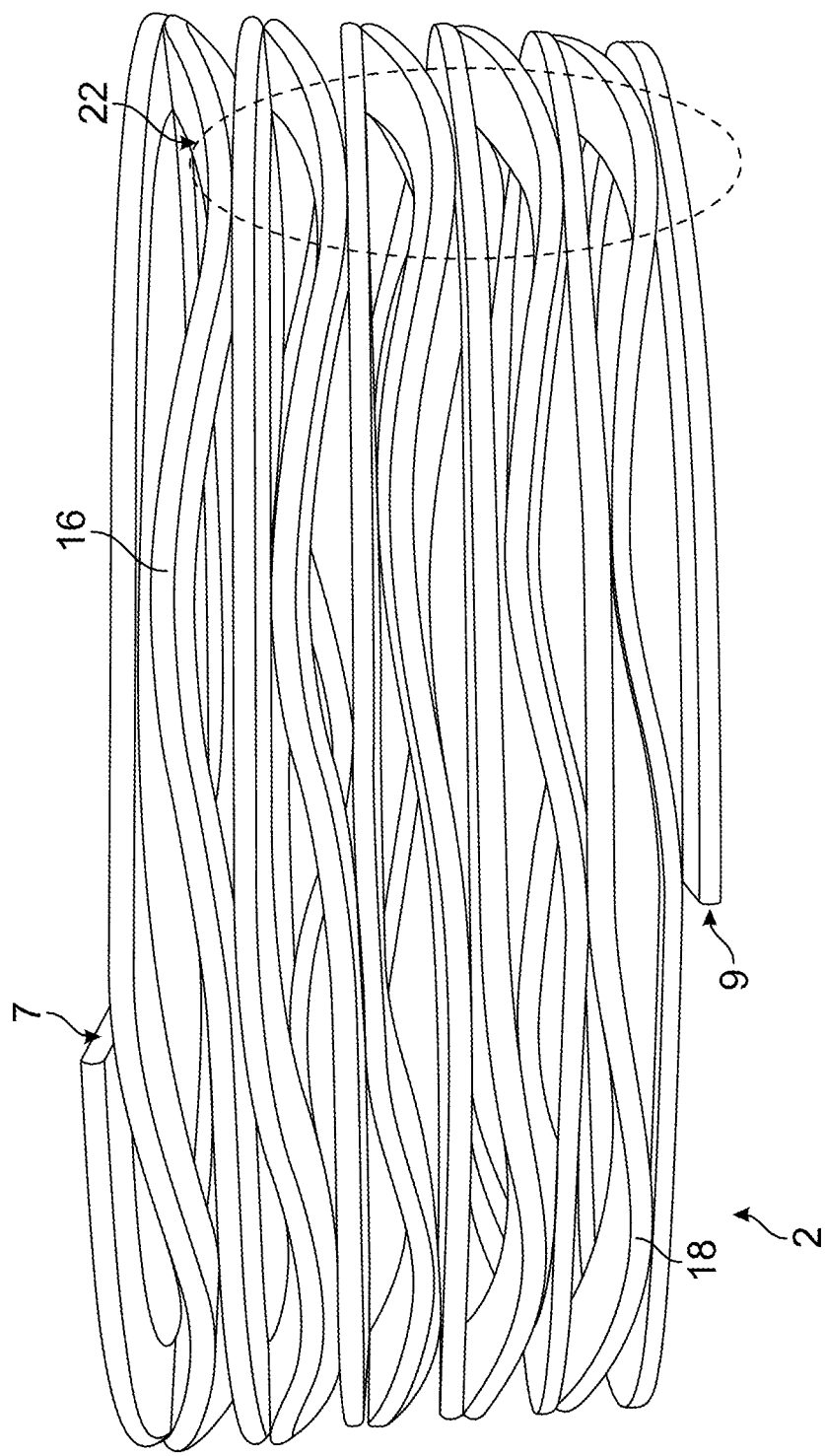
FIG. 4 is a third side plan view of a multiple variable turn wave spring, according to one or more embodiments of the present disclosure.

As shown in FIG. 4, a second aligned portion 22 of the spring 2 may comprise a second alignment of the active turns 12 such that two or more crests 16 of two or more active turns 12 overlap each other and/or two or more troughs 18 of two or more active turns 12 overlap each other. For example, troughs 18 of higher- and lower-level active turns 12 may be aligned and/or crests 16 of higher- and lower-level active turns 12 may be aligned. In other words, the crests 16 of at least two active turns 12 may be aligned with each other and troughs 18 of at least two active turns 12 are aligned with each other. As a result of the second alignment of the active turns 12 in the second aligned portion 22, the spring 2 comprising the second aligned portion 22 may generate higher load values than those generated by a spring 2 comprising the first aligned portion 20 and/or a wave spring free of the first aligned portion 20 and/or the second aligned portion 22. In an embodiment, the first aligned portion 20 of a spring 2 may generate higher load values than load values producible by the second aligned portion of a different spring 2.

In embodiments, a method of manufacturing the spring 2 may comprise coiling the wire 4 onto itself to produce the spring 2 having the height defined between the first and second end portions 6, 8 and/or by the first and second end portions 6, 8 and the intermediate portion 10. At least three (3) forming rollers create a circle with one or more turns (i.e., at least one active turn 12 and/or at least one non-active turn 14) to desired specifications of the spring 2 in any diameter known to one of ordinary skill in the art. Custom designed tooling may not be necessary since the specifications and/or design may be changed or controlled by one or more adjustments to the feeding of the wire 4 and/or the forming rollers. Depending on the at least one raw material chosen for and/or utilized to form the spring 2, a stress relieving or heat treatment process may follow the forming process. In some embodiments, where necessary and/or desirable, a corrosion protection, e.g. by spraying oil on the surface of the spring 2, may be considered before packaging. In an embodiment, the method of manufacturing the spring 2 may comprise creating or forming one or more turns of the wire 4 via the forming rollers to form the spring 2, optionally adjusting the feeding of the wire 4 and/or the forming rollers to form the spring 2, optionally stress relieving or heat treating the spring 2, and optionally protecting the spring 2 by spraying a non-aqueous fluid or liquid onto one or more surfaces of the spring 2.

In embodiments, the spring 2 may be configured, adapted, sized, shaped, and/or designed to pre-load one or more components wherein the one or more components may be rotatable relatively to or with respect to the spring 2. In an embodiment, the one or more components may comprise an outer ring of a rolling contact bearing as part of an automotive e-motor application. In some embodiments, it may be evaluated positive when an axial force provided by the spring 2 may be applied against the one or more components which may comprise at least one bearing. In an embodiment, the at least one bearing may be a rolling contact bearing. Since most of the at least one bearing may be sitting or disposed loose in the bearing housing, the at least one bearing may start vibrating during operation. These vibrations may cause: unwanted noise; additional vibrations; wear that may also reduce lifetime of the whole application of the spring 2; or at least one combination thereof.

In summary, the positioning of the active turns 12 of the spring 2 with respect to each other may directly and/or significantly affect the load and/or the axial force generated by the spring 2. When the crests 16 and the troughs 18 of the spring 2 are aligned with each other, higher load and/or axial force may be generated by the spring 2. Alternatively, aligning at least two crests 16 with one another and/or aligning at least two troughs 18 with one another may lower the load and/or the axial force producible by the spring 2.

Due to friction between the surfaces of the spring 2 and the at least one bearing, a torsional load may be applied to the spring 2. As a result, the spring 2 may collapse such that an original specified load may not be correctly provided to the at least one bearing.

Figure 5:
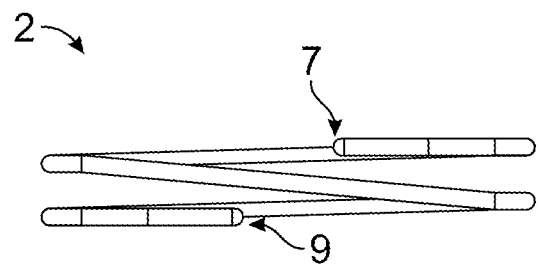
FIG. 5 is a side plan view of a multiple variable turn wave spring wound in a first winding direction, according to one or more embodiments of the present disclosure.
Figure 6:
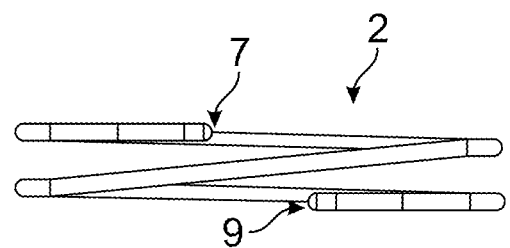
FIG. 6 is a side plan view of a multiple variable turn wave spring wound in a second winding direction, according to one or more embodiments of the present disclosure.
Figure 7:
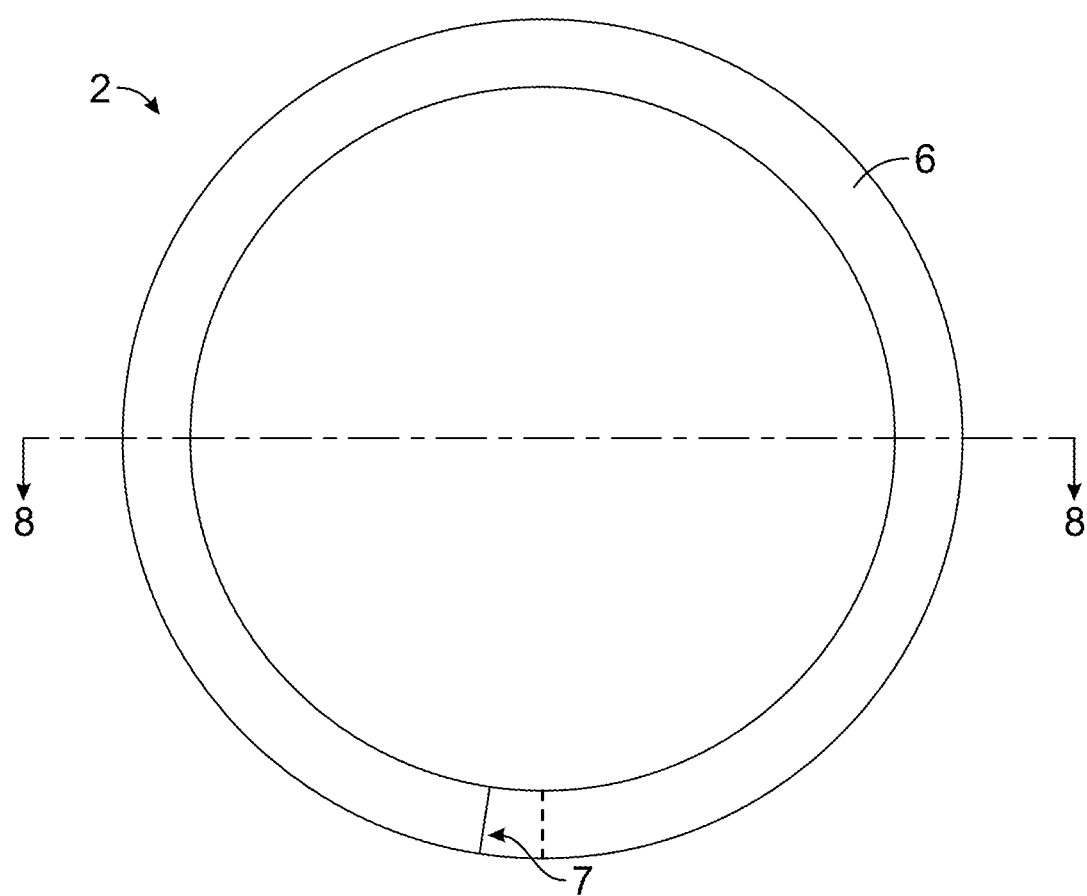
FIG. 7 is a top plan view of a multiple variable turn wave spring wound, according to one or more embodiments of the present disclosure.

In one or more embodiments, the at least one raw material and/or the wire 4 of the spring 2 may at least one rolled round wire winded in a first winding direction or a second winding direction. For example, the first winding direction of the spring 2 may be in the right-handed direction or the clockwise direction as shown in FIG. 5 and the second winding direction of the spring 2 may be in the left-handed direction or the counter-clockwise direction as shown in FIG. 6. Generally, the spring may be rolled or winded in the first winding direction. However, the first winding direction of spring 2 may, in some embodiments, be problematic for one or more specific applications which are rotating or rotatable in the counter-clockwise direction. Depending on the axial force to be applied and/or provided by the spring 2 and the influence of friction between the spring 2 and at least one mating component (not shown in the drawings), the counter clockwise-rotation of the at least one mating component may cause at least one end of the first and second ends 7, 9 of the spring 2 to caught and/or restricted or prohibited from slipping, rotating and/or moving with respect to the at least one mating component. Instead of letting the at least one end of the first and second ends 7, 9 slip, rotate, and/or move over at least one surface of the at least one mating component. As a result, risks of one or more torsional loads applied to the spring 2 may intensify and/or may lead to at least one end of the first and second ends 7, 9, slipping, rotating, and/or moving radially until the turn may start or begin to flip, slip, rotate, and/or move over at least one second turn of the spring 2. In some embodiments, at least one portion of the first and second portions 6, 8 may include, comprise, and/or consist of a dedicated, adjacent, and/or initial first turn of the spring which, as a result of the one or more torsional loads, may start moving, turning, or rotating radially until the initial first turn may start to flip, slip, rotate, and/or move over at least one second turn of the spring 2. To minimize the risks of one or more torsional loads, the spring 2 may be wound in the second winding direction or the counter-clockwise direction. As a result of being wound in the second winding direction, the resulting spring 2 (i.e., wound in the second winding direction) may substantially minimize, restrict, and/or prohibit the risks of the one or more torsional loads.

In one or more embodiments, at least one end of the first end 7 and the second end 9 of the spring 2 (collectively known hereinafter as "at least one end 7, 9") may have one or more first cut off positions that may lead to the at least one end 7, 9 contacting, touching, and/or abutting an adjacent first turn 30 of the spring 2 or an adjacent last turn 32. The spring 2 comprising the at least one end 7, 9 having first cut off positions, the first turn 30, and the last turn 32 are shown in FIGS. 7-10. Due to the contact between the first and second ends 7, 9 and adjacent turns (i.e., last turn 32 and first turn 30, respectively, collectively referred to hereinafter as "turns 32, 30")) the first and second ends 7, 9 may not be positioned at or located on a same height level or plane than a height level or plane of the turns 32, 30, respectively. As a result, the first and second ends 7, 9 of the spring 2 may get caught or restricted by one or more mating components (not shown in the drawings) upon application of at least one relative movement between the spring 2 and the one or more mating components. Furthermore, when the one or more mating components may be made of one or more soft materials, then the ends 7, 9 may cause damage to and/or destruction of one or more surfaces of the one or more mating components.

Figure 11:
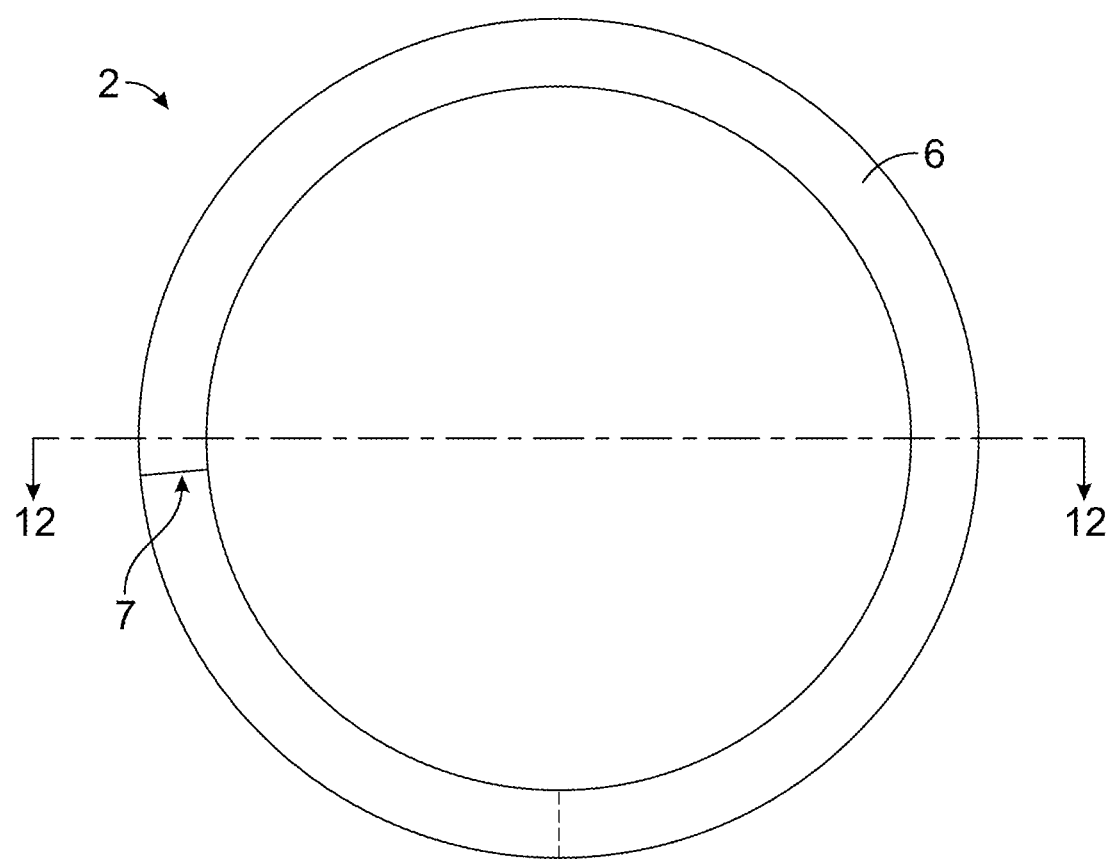
FIG. 11 is a top plan view of a multiple variable turn wave spring wound, according to one or more embodiments of the present disclosure.
Figure 12:
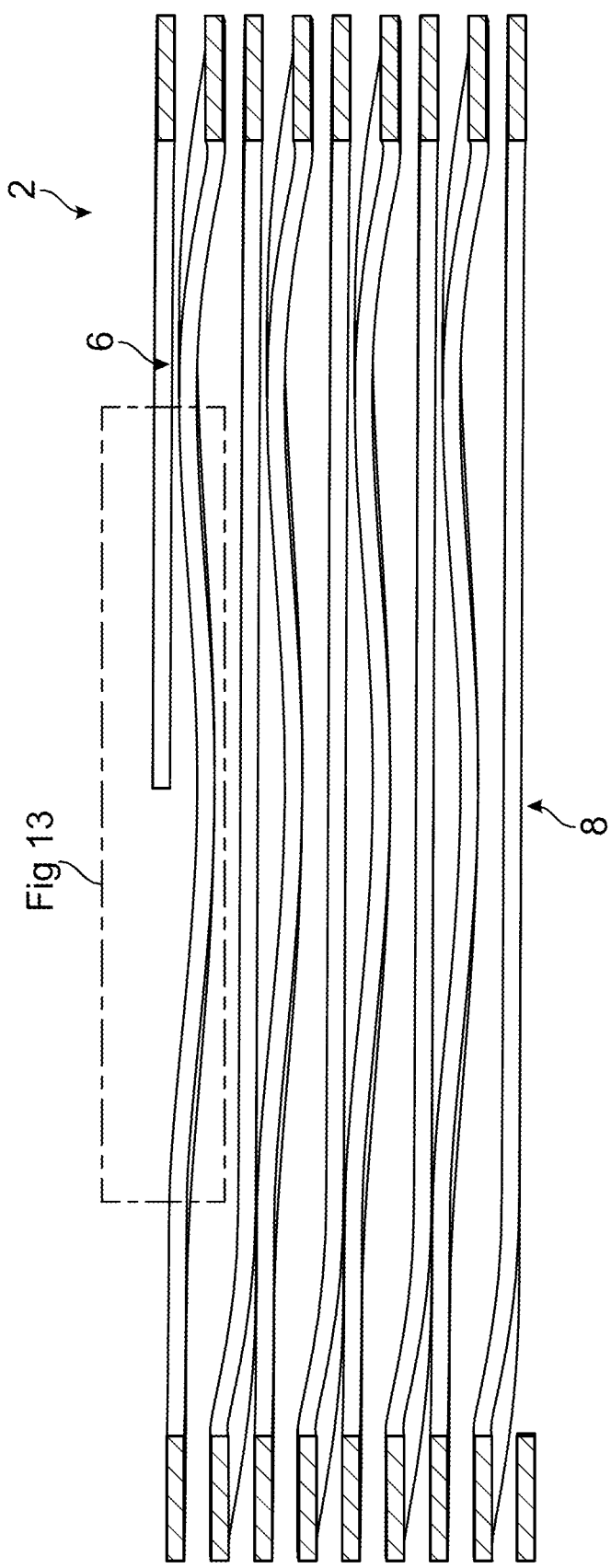
FIG. 12 is a cross-sectional view of a multiple variable turn wave spring along line 12-12 shown in FIG. 11, according to one or more embodiments of the present disclosure.
Figure 13:
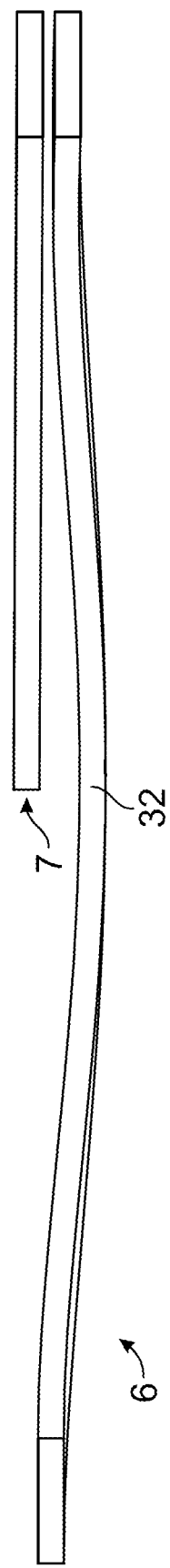
FIG. 13 is a partial cross-sectional view of a first end portion of a multiple variable turn wave spring, according to one or more embodiments of the present disclosure.

In one or more embodiments, the first and second ends 7, 9 of the spring may be and/or may comprise or consist of floating ends as shown in FIGS. 11-13. The floating ends of the spring 2 may bring the first and second ends 7, 9, on or to a same height level as the height level of the turns 32, 30, respectively. As a result, the cut off positions of the first and second ends 7, 9 may be moved closer to a centerline of the troughs 18 of sub-turns provided in the spring 2 such that there may no longer be any contact between the first and second ends 7, 9 and the turns 32, 30, respectively, as shown in FIGS. 12 and 13.

Figure 14:
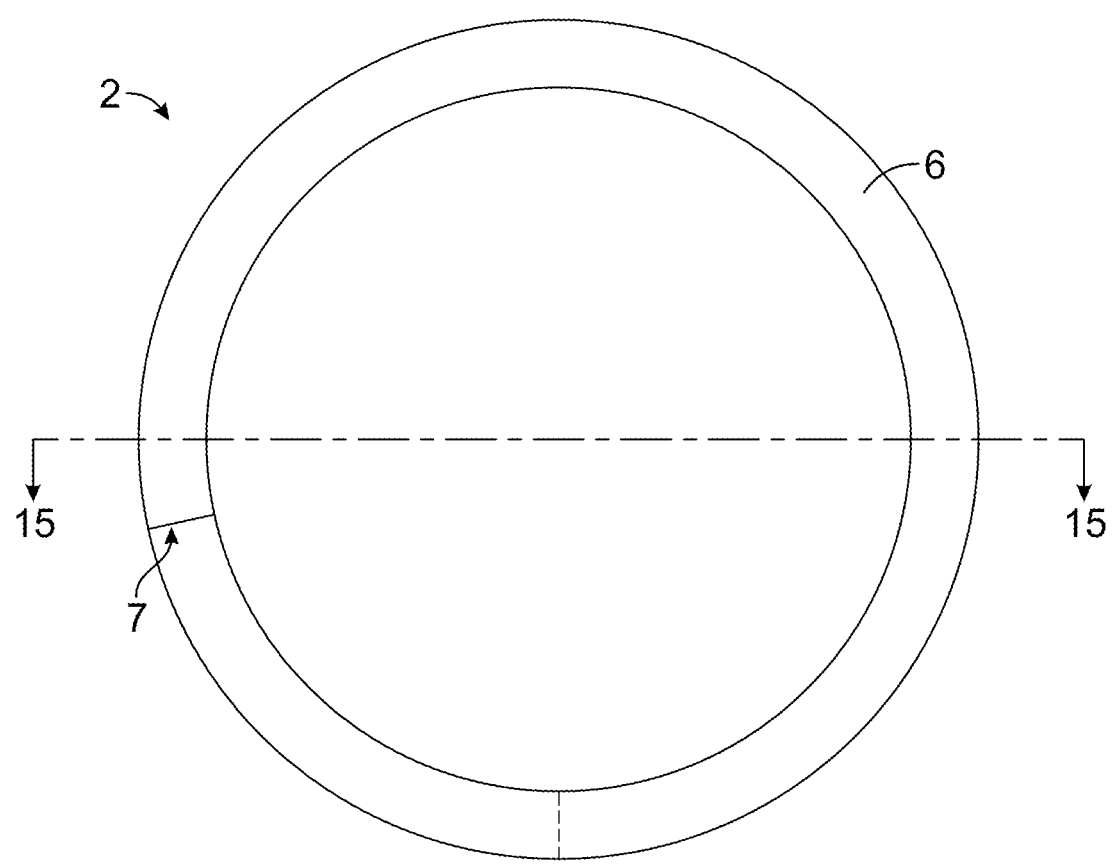
FIG. 14 is a top plan view of a multiple variable turn wave spring wound, according to one or more embodiments of the present disclosure.
Figure 15:
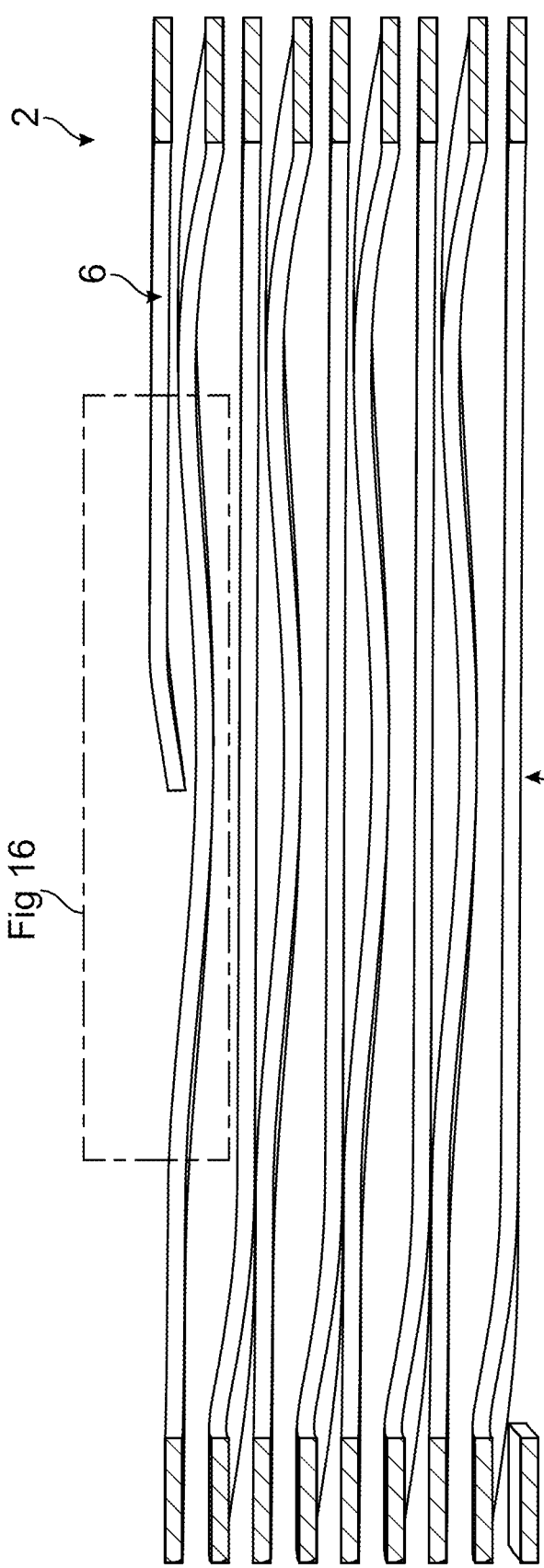
FIG. 15 is a cross-sectional view of a multiple variable turn wave spring along line 15-15 shown in FIG. 14, according to one or more embodiments of the present disclosure.
Figure 16:
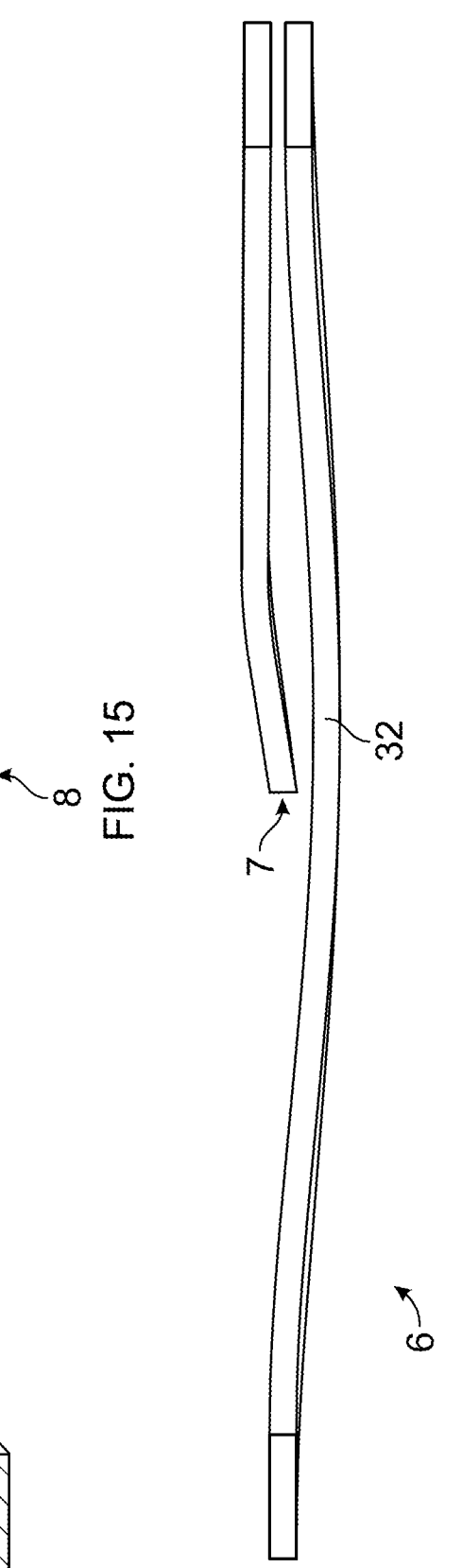
FIG. 16 is a partial cross-sectional view of a first end portion of a multiple variable turn wave spring, according to one or more embodiments of the present disclosure.

In one or more embodiments, one or more of the surfaces of the one or more mating components may be highly sensitive or made of highly sensitive raw materials and the first and second ends 7, 9 may be and/or may comprise or consist of bent ends as shown in FIGS. 14-16. As a result, the bent ends of the spring 2 may limit, restrict, and/or prevent one or more cut off areas of the first and second ends 7, 9 from contacting, touching, and/or abutting the one or more surfaces of the one or more mating components. In some embodiments, the first and second ends 7, 9 of the spring 2 may be or may comprise or consist of the floating ends which may be bent axially away from one or more positions of the one or more mating components to form, provide, or produce the bent ends as shown in FIGS. 15 and 16. In at least one embodiment, the at least one end 7, 9 of the spring 2 may have and/or may comprise or consist of at least one first cut off position, at least one floating end, at least one bent end, or at least one combination thereof.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A wave spring having multiple variable turns, the wave spring comprising:
   a total height defined by a first end portion and a second opposite end portion;
   an intermediate portion disposed between the first and second end portions and comprising:
      active turns comprising waved or non-planar turns; and
      a plurality of non-active turns comprising planar or non-waved turns; and
   a first alignment disposed between the first and second end portions, wherein first alignment comprises at least two waved or non-planar turns being aligned with each other,
   wherein
   at least one first non-active turn of the plurality of non-active turns is disposed between two active turns, the first end portion terminates at a floating end having a cut off position adjacent to a wave trough of an adjacent active turn that is disposed between two wave crests of the adjacent active turn such that the first end portion is free of contact from the intermediate portion, a second non-active turn of the plurality of non-active turns comprises the first end portion that terminates at the floating end, and the first end portion is axially bent with respect to the second non-active turn such that the floating end is axially bent towards the wave trough of the adjacent active turn.

2. The wave spring of claim 1, wherein at least one first non-active turn is disposed between the at least two waved or non-planar turns that are aligned with each other.

3. The wave spring of claim 1, wherein the at least two waved or non-planar turns comprise at least one wave crest and at least one wave trough.

4. The wave spring of claim 1, wherein the at least two waved or non-planar turns comprise either at least two wave crests or at least two wave troughs.

5. The wave spring of claim 1, wherein the cut off position of the floating end is adjacent to a centerline of the wave trough of the adjacent active turn.

6. A method comprising:
coiling a flat wire onto itself to produce a wave spring that comprises:
a first end portion;
a second end portion opposite with respect to the first end portion;
active turns disposed between the first and second end portions and comprising waved or non-planar turns;
a plurality of non-active turns disposed between the first and second end portions and comprising planar or non-waved turns;
an aligned portion of the active and non-active turns having at least one first non-active turn disposed between at least two active turns; and
a floating end of the first end portion having a cut off point adjacent to a wave trough of an adjacent active turn that is disposed between two wave crests of the adjacent active turn such that the first end portion is spaced apart from the active turns and the non-active turns of the wave spring,
wherein
a second non-active turn of the plurality of non-active turns comprises the first end portion that terminates at the floating end and the first end portion is axially bent with respect to the second non-active turn such that the floating end is axially bent towards the wave trough of the adjacent active turn.

7. The method of claim 6, wherein the at least two active turns comprise at least two wave troughs, at least two wave crests, or at least one wave trough and at least one wave crest.

8. The method of claim 7, wherein the at least two wave crests or the at least two wave troughs are aligned with respect to each other and at least a portion of the at least one first non-active turn is disposed therebetween.

9. The method of claim 7, wherein the at least one wave trough is aligned with the at least one wave crest and at least a portion of the at least one first non-active turn is disposed therebetween.

10. The method of claim 6, further comprising:
preloading at least one component of an automotive e-motor with the wave spring.

11. The method of claim 6, further comprising:
applying an axial force provided by the wave spring against at least one component; or
placing at least one torsional load on or against the spring.

12. The method of claim 6, further comprising:
disposing the first end portion adjacent to one or more surfaces of at least one mating component,
wherein
the bent end prevents the one or more cut off areas of the first end portion from contacting and/or abutting the one or more surfaces of the at least one mating component.

13. A method comprising:
applying at least one torsional load on or against a wave spring, wherein the wave spring comprises:
an intermediate portion disposed between a first end portion and a second end portion opposite with respect to the first end portion;
active turns disposed between the first and second end portions and comprising at least one wave crest, at least one wave trough, or at least one combination thereof;
at least one first a-planar or non-waved turn disposed between at least two active turns;
an aligned portion disposed at the intermediate portion, wherein the aligned portion comprises at least two active turns having wave crests, wave troughs, or at least one wave crest and at least one wave trough; and
a floating end of the first end portion or floating ends of the first and second end portions, wherein
each floating end has a cut off position adjacent a wave trough of an adjacent active turn that is disposed between two wave crests of the adjacent active turn such that each floating end is free of contact with the intermediate portion and the active turns of the wave spring, and
a second planar or non-waved turn comprises the first end portion terminating at the floating end or two second planar or non-waved turns comprise the first and second end portions terminating at the floating ends,
wherein
the first end portion is axially bent with respect to the second non-active turn such that the floating end is axially bent towards the wave trough of the adjacent active turn or the first and second end portions are axially bent with respect to the two second planar or non-waved turns such that the floating ends are axially bent towards the wave troughs of the adjacent active turns.

14. The method of claim 13, wherein at least component applies the at least one torsional load on or against the wave spring.

15. The method of claim 13, wherein the aligned portion comprises wave crests or wave troughs aligned with respect to each other.

16. The method of claim 13, wherein the at least one wave crest and the at least one wave trough of the aligned portion are aligned with respect to each other.

17. The method of claim 13, wherein at least one first non-active turn of the intermediate portion is planar or comprises one or more non-waved curves or turns.

18. The method of claim 17, wherein the at least one first non-active turn is disposed between two adjacent active turns.

19. The method of claim 13, further comprising:
applying an axial force provided by the wave spring against at least one component for preloading the at least one component.

* * * * *